Oct. 21, 1924.　　　　　　　　　　　　　　　　1,512,787
H. D. MORTON
MEANS AND METHOD FOR EFFECTING CONTINUOUS ELECTRIC ARC WELDS
Filed Feb. 5, 1924　　　　2 Sheets-Sheet 1
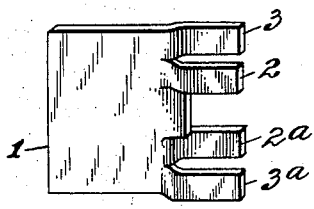
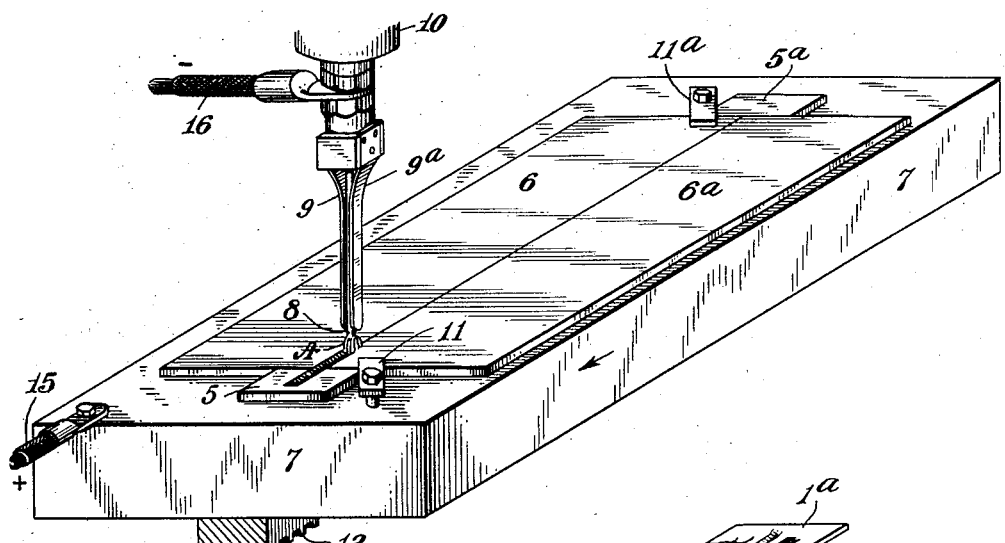
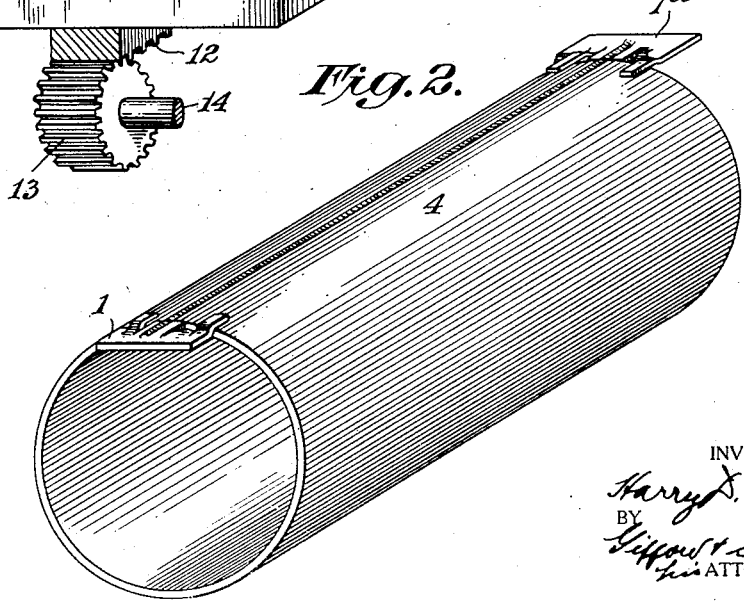
INVENTOR
Harry D. Morton
BY
ATTORNEYS Oct. 21, 1924. 1,512,787
H. D. MORTON
MEANS AND METHOD FOR EFFECTING CONTINUOUS ELECTRIC ARC WELDS
Filed Feb. 5, 1924 2 Sheets-Sheet 2
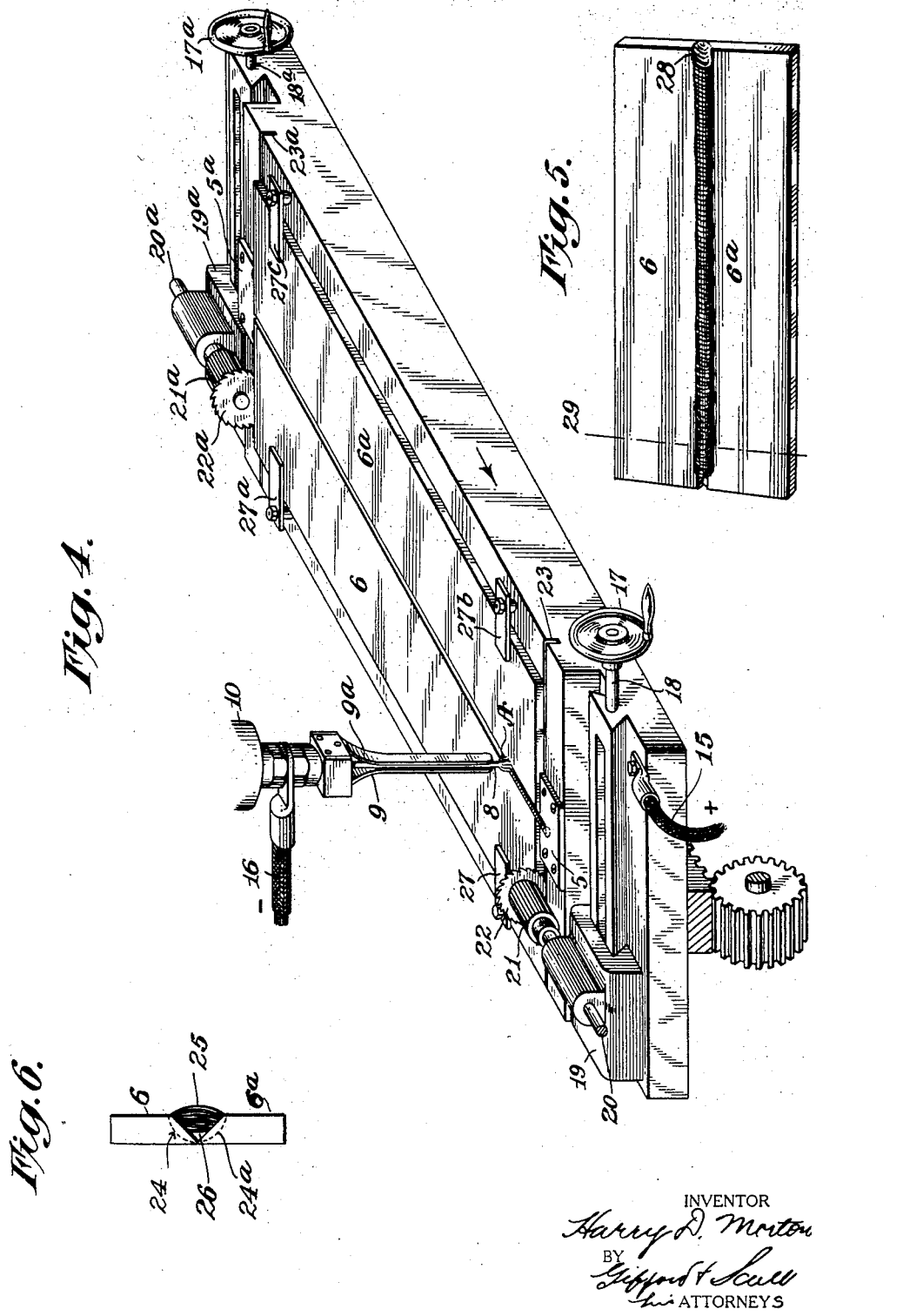
INVENTOR
Harry D. Morton
BY
Gifford & Scull
ATTORNEYS Patented Oct. 21, 1924.

1,512,787

UNITED STATES PATENT OFFICE.

HARRY D. MORTON, OF NEW YORK, N. Y.

MEANS AND METHOD FOR EFFECTING CONTINUOUS ELECTRIC-ARC WELDS.

Application filed February 5, 1924. Serial No. 690,702.

*To all whom it may concern:*

Be it known that I, HARRY D. MORTON, a citizen of the United States, residing in the city of New York, county of New York, and State of New York, have invented certain new and useful Improvements in Means and Methods for Effecting Continuous Electric-Arc Welds, of which the following is a specification.

The following is a description of methods and means for effecting continuous electric arc welds embodying my invention in the form and manner at present preferred by me; but it will be understood that various modifications and changes may be made without departing from the spirit of my invention and without exceeding the scope of my claims.

My invention will best be understood by reference to the accompanying drawings, in which I have illustrated the preferred forms of device for carrying out my invention, and in which Fig. 1 shows in perspective a metallic clip comprising means for carrying out one form of my invention; Fig. 2 is a perspective view of one form of work showing the manner of attaching thereto the clips of Fig. 1; Fig. 3 shows in perspective a further modification of my invention; Fig. 4 shows in perspective a still further modification of my invention; Fig. 5 shows in perspective the results produced when the welding operation is carried out by present methods; and Fig. 6 is an end view of Fig. 5.

Like reference characters indicate like parts throughout the drawings.

Referring to the drawings, the metallic clip 1 shown in Fig. 1 has formed in one side two pairs of projections 2—2$^a$ and 3—3$^a$, said projections being staggered with reference to the body of the clip, whereby said clips may be attached to either end of work to be welded when no work chill is employed, as, for instance, at 1 and 1$^a$ of the cylinder 4 of Fig. 2. After the weld is completed, the clips 1 and 1$^a$ are separated from the work by breaking or cutting the metal which has been fused and deposited at the joint between the ends of the work and said clips respectively.

In Fig. 3 I show other means for carrying out my invention, wherein the metal blocks 5 and 5$^a$ and the work are positioned upon a chill comprising the table 7, adjacent to the ends respectively of the work, consisting, in this case, of the plates 6 and 6$^a$. The work and the metal blocks 5 and 5$^a$ are held in position upon table 7 by clamps 11 and 11$^a$, respectively. An arc is struck (by means well known to those skilled in the art) between the welding pencil 8, of one polarity, and the metallic block 5, of opposite polarity—the work and the metal block 5$^a$ being in electrical contact with the block 5. The welding pencil 8 may be fed manually or automatically (by means well known to those skilled in the art) from welding head 10, through the contact members 9—9$^a$, and to the work. As shown in Fig. 3, the welding head 10 is stationary, and the table 7 carrying the work and blocks 5—5$^a$ is moved with reference to the arc by the rotation (either manual or automatic) of shaft 14, carrying pinion 13, meshing with rack 12 at the bottom of table 7. Current from the positive pole of a source of electrical energy flows through cable 15 to table 7, to conductors 5 and 5$^a$ and work 6—6$^a$, in electrical contact with said table, across the arc A, through the welding pencil 8, contact members 9—9$^a$ and cable 16 to the opposite pole of said source. A portion of the blocks 5 and 5$^a$ and of the work material is fused by the arc, and, if the welding pencil 8 comprises a metallic welding strip, fused metal is deposited to form a continuous body of metal from the point where the arc is struck on the block 5, between said block and the plates 6 and 6$^a$, comprising the work, along said work, and between said work and block 5$^a$ to the point on block 5$^a$ where the arc is ruptured. After the weld is completed, the work, with the attached blocks 5 and 5$^a$, is removed from table 7, and said blocks are separated from the work by breaking or cutting the metal which has been fused and deposited at the joints between the work and the blocks respectively.

Fig. 4 shows a modification of my invention, wherein the metal blocks 5 and 5$^a$ are more or less permanently attached to the table 7. Upon completion of the weld, the rotation of handwheels 17 and 17$^a$ and the lead screws 18 and 18$^a$ moves the carriages 19 and 19$^a$ to the right, so that the cutters 21 and 21$^a$ (driven by power applied to shafts 20 and 20$^a$) pass over blocks 5 and 5$^a$, respectively, and remove from said blocks a portion of the metal which has been deposited thereon by the arc. Simultaneously the saws 22 and 22$^a$, rotating in the slots 23 and 23ª, respectively, cut through the metal which has been fused and deposited by the arc at the joints between the ends of the work 6—6ª and the blocks 5—5ª, respectively, thereby separating the work from said blocks. In this case it is not necessary to supply new blocks adjacent to the ends of the work for each successive weld, as the blocks 5 and 5ª may be used indefinitely for arc-striking and arc-rupturing purposes. It is to be understood that the lead screws 18 and 18ª may, if desired, be power driven, so that the machining of the deposited metal from the blocks 5 and 5ª, and the cutting of the connections between said blocks and the ends of the work, may be carried out automatically instead of manually.

In Figs. 5 and 6 I illustrate a weld made by present methods, and without the employment of my invention. In this case the arc is struck at the left-hand end of the seam between the plates 6 and 6ª (Fig. 5), and finished at the right-hand end thereof.

It is well known to those skilled in the art that the action of the metallic welding arc is as follows: After the arc has been applied to the work for a few seconds, its heat fuses the abutting edges of the work material and forms a crater which contains a bath of molten work material metal. As the welding strip is progressively fused, the molten metal from the strip is projected by the arc into this molten bath, where it coalesces with the molten work material metal and forms the weld. This crater, which surrounds the point of impact of the arc upon the work and constitutes a zone of considerable area, must always accompany the arc if a metallic arc weld is to be effected. It is equally well known, however, that at the outset, when the arc is playing upon cold work material, and for a distance of perhaps ⅜″ to ½″ from the arc-striking point, in the line of the seam, no crater is formed, and no weld is effected—the molten metal of the welding strip merely adhering to the surface of the work or to the scarfed edges thereof. The reason for this is that when the arc is first struck, and for a few seconds thereafter, the cold work material acts as a chill against which the molten material of the welding strip almost instantaneously solidifies without penetration by the arc of the work material. There is therefore no coalescence of molten welding strip material and molten work material. The welding process begins only when the work material has become sufficiently heated by the arc to form a crater containing a bath of molten metal. In producing an annular weld, even if it be sought to overcome the failure to effect a weld at the outset by overlapping at the completion of the weld, the deposit of metal which merely adheres to the work prevents a direct impact of the arc upon the work, so that it is not possible to overcome the defect. The result is that in metallic arc welding (particularly in automatic metallic arc welding) the first portion of the seam is not welded. Therefore if a continuous weld is necessary throughout the length of the seam, as shown in the accompanying drawings, the work material must be removed to the point where welding actually begins, as, for example, between the left-hand end of the work 6—6ª and the point indicated by line 29 in Fig. 5. This of course involves additional work and the loss of considerable material. My invention overcomes this objectionable feature of metallic arc welding by providing means for striking the arc on material outside the work but in electrical contact therewith, and carrying said arc over onto the work only after it has been in operation a sufficient length of time to insure that a substantial crater has been formed. After the weld is completed, the arc-striking clip or block is separated from the work material and either discarded or machined preparatory to another arc-striking operation.

Fig. 6 shows more clearly the action of the arc when first struck. The dotted lines 24—24ª indicate the outline of the crater necessary to produce a weld and which is formed when the arc is well under way; the deposit 25 illustrates the manner in which the fused material of the welding strip merely adheres to the scarfed edges of the plates 6—6ª; and the V-shaped portion 26 indicates the result of failure of the fused welding strip material to reach the bottom of the groove formed by the scarfed edges of the plates, due to the absence of the crater.

When the arc is in normal operation, and in the course of its movement relative to the work, the crater which accompanies the arc is continually being formed in advance of the arc and is progressively being filled with fused metal from the welding strip. At the finish of the weld (particularly if the weld is produced automatically) an unfilled crater, as shown at 28 of Fig. 5, is left at the end of the work where the arc passes off the work and ruptures. In this case also a portion of the work must be cut off, which obviously involves additional labor and waste of material. My invention overcomes this difficulty by providing means whereby the arc, instead of being ruptured at some point on the work, is carried over onto material outside the work, and ruptured on such outside material. Thereafter, the arc-rupturing clip or block is separated from the work material, and either discarded or machined preparatory to another arc-rupturing operation. It is to be understood that the arc may be ruptured by allowing it to pass off the arc-rupturing clip or block, by opening the welding switch, by reversing the direction of feed of the welding strip, or in any other suitable manner well known to those skilled in the art.

I am therefore enabled by the means and methods shown and described to produce continuous, homogeneous, thorough and efficient welds throughout the length of the work material, and without the additional labor and the waste of material incident to the present welding methods.

What I claim as new and desire to secure by Letters Patent of the United States is:

1. The method of electric arc welding which consists in depositing molten metal upon three electrically connected members and separating said members.

2. The method of electric arc welding which consists in welding along the work and continuing the weld to an auxiliary member separable from the work.

3. The method of electric arc welding which consists in welding along the work and continuing the weld to an auxiliary member separable from the work, and separating said auxiliary member from the work.

4. The method of electric arc welding which consists in depositing metal upon an auxiliary member separable from the work and continuing the weld in the work.

5. The method of electric arc welding which consists in depositing metal upon an auxiliary member separable from the work, continuing the weld in the work and separating said member from the work.

6. The method of electric arc welding which consists in depositing metal upon an auxiliary member separable from the work and continuing the weld along the work and to a second auxiliary member separable from the work.

7. The method of electric arc welding which consists in depositing metal upon an auxiliary member separable from the work and continuing the weld along the work and to a second auxiliary member separable from the work, and separating said members from the work.

8. The method of electric arc welding which consists in depositing molten metal upon the work and upon an auxiliary member separable therefrom and removing a portion of the metal deposited upon said member.

9. The improvement in that method of electric arc welding wherein a metallic welding strip is connected to one terminal of a source of electrical energy and the work is connected to the other terminal of said source, which consists in striking an arc between said welding strip and a conductor adjacent to one end of the work and electrically connected to said work, feeding the welding strip to the arc, effecting relative movement between the work and the welding strip feeding means whereby a crater is progressively formed and filled at the joint between said conductor and the work, along the seam to be welded and in a second conductor adjacent to the opposite end of the work and electrically connected to said work, and rupturing said arc.

10. In electric arc welding, the combination of a welding pencil electrically connected to one pole of a source of electric energy and the work with a separable auxiliary member for receiving molten metal electrically connected to the other pole of said source of electric energy.

11. In electric arc welding, the combination of a welding pencil electrically connected to one pole of a source of electric energy and the work with two separable auxiliary members for receiving molten metal electrically connected to the other pole of said source of electric energy.

12. In electric arc welding, a source of electrical energy, electrical connections from one terminal of said source to a welding pencil and from the other terminal of said source to the work to be welded, and members between which and said welding pencil an arc is established and ruptured, respectively, said members being separable from the work and in electrical contact therewith.

13. In electric arc welding, a welding circuit, a welding pencil and work to be welded included in said circuit, a separable conductor in electrical contact with the work and between which and the welding pencil an arc is adapted to be struck, and another separable conductor in electrical contact with the work and between which and the welding pencil the arc is adapted to be ruptured.

14. In electric arc welding wherein molten metal is deposited in an opening between scarfed edges of work material, automatic means for feeding a welding strip constituting one electrode to the work constituting the other electrode, means for effecting continuous relative movement between the welding strip feeding means and the work, and means for filling said opening with welding material throughout a seam forming an unclosed path.

HARRY D. MORTON.